US00RE39602E

(19) United States
(12) Reissued Patent
Baumgartner et al.

(10) Patent Number: US RE39,602 E
(45) Date of Reissued Patent: May 1, 2007

(54) FISHING REELS WITH A SPOOL RECEIVING THE FISHING LINE

(75) Inventors: Walter Baumgartner, Raiffeisenstrasse A5, 91741 Theilenhofen (DE); Dieter Hamann, Kirchheim (DE)

(73) Assignee: Walter Baumgartner, Theilenhofen (DE)

(21) Appl. No.: 09/728,831

(22) Filed: Dec. 1, 2000

Related U.S. Patent Documents

Reissue of:
(64) Patent No.: 5,350,131
Issued: Sep. 27, 1994
Appl. No.: 07/788,801
Filed: Nov. 7, 1991

(30) Foreign Application Priority Data

Nov. 10, 1990 (DE) ..... 4035846

(51) Int. Cl.
*A01K 89/015* (2006.01)

(52) U.S. Cl. ..... 242/242; 242/484.1
(58) Field of Classification Search ..... 242/241, 242/242, 477.3, 482.8, 484.1
See application file for complete search history.

(56) References Cited

U.S. PATENT DOCUMENTS

| | | | | |
|---|---|---|---|---|
| 2,724,563 A | 11/1955 | Shakespeare et al. | ..... | 242/242 |
| 4,191,343 A | 3/1980 | Morishita | ..... | 242/242 |
| 5,143,318 A | 9/1992 | Tipton et al. | ..... | 242/241 |

FOREIGN PATENT DOCUMENTS

| | | | | |
|---|---|---|---|---|
| DE | 917518 | 1/1954 | | |
| DE | 944828 | 6/1956 | ..... | 242/242 |
| DE | 7006743 | 2/1970 | | |
| DE | 7007657 | 3/1970 | | |
| DE | 3417716 | 11/1985 | | |
| FR | 2264480 | 10/1975 | ..... | 242/242 |
| IT | 694177 | 9/1965 | ..... | 242/242 |
| JP | 0006497 | 2/1974 | | |
| KR | 9867/87 | 5/1989 | | |
| KR | 4027/90 | 5/1990 | | |

*Primary Examiner*—Emmanuel M Marcelo
(74) *Attorney, Agent, or Firm*—Laurence A. Greenberg; Werner H. Stemer; Ralph E. Locher

(57) ABSTRACT

In a fishing reel of the type in which the spool for receiving the fishing line is caused to more to and fro in the direction of its winding axis in response to a cam drive for driving a spindle attached to the spool, the cam drive including a guide part with a guide slot into which projects an eccentrically mounted cam stud, the guide slot is in the form of an elongated S in order to impart an acceleration to the spool at its reversing points, and thereby prevent formation of bulges at the sides of the spool during winding. The locations in the guide slot corresponding to reversing points of the spool are offset from a center line of the guide slots along a longitudinal axis of the slot in a direction perpendicular to the stroke direction, resulting in the above-described acceleration and also having the effect of increasing displacement of the cam drive mechanism in the stroke direction.

6 Claims, 5 Drawing Sheets

FISHING REELS WITH A SPOOL RECEIVING THE FISHING LINE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention concerns a fishing reel of the type including a spool for receiving the fishing line, the spool being moved to and fro in the direction of its winding axis (spool travel) by means of a cam drive, the cam drive including a gear, a cam stud eccentrically mounted on the gear, a guide plate mounted to the spool via a spindle, shaft, or the like, and a guide slot in the guide plate for engagement with the rotating cam stud to drive the spindle or shaft to and fro in its longitudinal direction.

2. Description of Related Art

A straight guide slot was offered in previously known designs for the above type of fishing reel. While such a design has been found practical for narrow spools, if the width of the spool must be made larger to permit more fishing line to be wound onto the same diameter of spool core, outwardly projecting bulges may form at the two end zones of the line winding because of changes in spool speed caused as the spool approaches the reversing positions of the spool travel path. The width must be further enlarged if the spool core diameter is to be made larger without thereby enlarging the spool diameter, i.e., the diameter of the outer line winding, because otherwise the line capacity would be decreased. The bulge formation takes place as the travel or stroke speed drops down to zero at the cam stud reversing positions, i.e., at the end positions of the reciprocating spool stroke, because the amount of line wound per unit time by the winding flange of the fishing line onto the spool will not decrease but remain constant, regardless of which position the spool assumes in the travel direction. When the fishing line plus bait is cast, the bulge causes the problem of "clinging", i.e., the line cast from the spool drags along adjacent line turns. This leads to the so-called wig formation as the excess line dragged along by clinging hangs loose and tangles. In turn, this leads to delicate casting, subject to interference.

To avert the above drawbacks, a fishing line was proposed in FIG. 4 of the German Gebrauchsmuster 70 06 743, in which the reciprocating spool assembly includes a cam drive guide slot curved in such a way that the stroke speed of the guide part increases at the reversing positions of the stroke path and at least partly drops at the side positions approximately half-way between the two reversing positions along the circular path of the cam stud so that the backward and forward stroke speeds of the guide part are nearly equal at the half-way positions. According to the description of the Gebrauchsmuster 70 06 743, a uniformly oscillating stroke, and thereby the desired rectilinear contour of the fishing line, is achieved. The guide slot provided for this purpose has a figure-8 curve, but the insides of the 8 do not touch and are spaced apart.

The figure-8 design suffers from a large axial play of the cam stud in the guide slot when at the end positions. Self-locking of the cam stud in the guide slot arises at these side positions or points. As a result, the cam stud jams and warps in the guide slot, and the force exerted by the drive gear on the cam stud when it is in the side positions cannot be converted into a corresponding motion of the guide slot and hence of the travel. In other words, at the guide slot side positions, axial play prevents continuity of the motion sequence for the cam stud in the slot. Accordingly, this previously known device is not practical. Other drawbacks are bulk and a comparatively slight travel.

The German Gebrauchsmuster 70 07 657 discloses a fishing reel as initially discussed herein in relation to the state of the art, with a rectilinear guide slot. In the illustrative embodiment of FIGS. 3 and 4 of this document 70 07 657, a drive gear with an eccentric stud engages a rectilinear guide slot of an intermediate part in the form of a travel or stroke converter. This stroke converter in turn consists of a guide slot in the shape of a slight S and is entered by a pin of the spool spindle. Accordingly, the controlling force from the drive gear must be converted by means of two guide slots into a corresponding stroke of the spool spindle.

Drawbacks of this arrangement include friction along the two guide slots, which may lead to jamming and locking the system, high device complexity resulting in increased cost, and bulkiness resulting from use of an intermediate part. Therefore, the design of FIGS. 3 and 4 of the German Gebrauchsmuster 70 07 657 is disadvantageous in comparison with a device wherein a single guide slot is provided in a single guide part affixed to the spool spindle. While a fishing-line reel with the line-drum remaining fixed is known from the German patent 917,528, the reel does not include an angled slot guide and only serves the specific function of allowing rotation the drive crank in one direction. Disadvantageously, the speed of the forward and backward spool strokes are different. This device precludes achieving neat and uniform winding contours.

SUMMARY OF THE INVENTION

It is therefore an objective of the present invention to make possible the widening of a reciprocating spool for a fishing reel in a simple manner while precluding or minimizing formation of bulges during winding of the fishing line to such an extent that no "wig formation" shall take place when casting.

This objective is achieved by providing a spindle cam-drive guide slot which assumes the shape of an elongated S, the cam stud being located approximately centrally in the S when at the reversing positions of the spool, and in one of the end zones of the S when at the side positions. The longitudinal direction of the S sub-tends an angle, preferably a right angle, with respect to the direction of the spool stroke. As a result, when the spool passes from one reversing position to the next side position and from the side position to the next reversing position etc, continuously changing stroke speeds are communicated by the motion of the cam stud to the guide part. As a result a number of advantages are secured. The shape of the guide slot as an S and the angle of the guide slot, preferably an approximately fight angle with respect to the longitudinal travel direction, prevent axial play from arising and hence prevents self-locking of the motion of the cam stud in the zone of the side positions. A substantially longer stroke is achieved than in the figure-8 shaped guide slot of the Gebrauchsmuster 70 06 743. The device of the invention is more compact and always achieves continuous change of the stroke speeds, improving the quality and the shape of the line winding on the spool. Compared with the device of Gebrauchsmuster 70 07 657, the drawback of an intermediate part and of two guide slots is avoided. Moreover, the design complexity and bulk are substantially less in the invention than in the device of Gebrauchsmuster 70 07 657. Accordingly, a minimum of expenditure, especially with respect to manufacturing costs, allows widening of the spool without the danger of a damaging bulge being formed even though the amount of fishing line wound by the winding flange onto the spool always remains constant in time, i.e., will not match different stroke speeds. Handling of the invention is simple and will not be hampered by self-locking or axial play because the cam stud is able to slide to and fro in a problem-free manner within the curved or arcuate side walls formed by the S.

In an especially preferred embodiment of the invention, the segments of the sidewalls in which the cam stud is located before reversal of the spool stroke are shifted more substantially toward the direction of stroke than are the segments at or near the side positions. By appropriately sizing the resulting to-and-fro guidance of the cam stud, the changes in stroke speed can be arrived at in an especially simple and accurate manner. Further, by offsetting both walls of the guide slot at their midway zones, displacement in the direction of stroke is increased. Finally, further compactness of the guide part is achieved by mirror-inverting the letter S shape of the guide slot.

Additional advantages of the invention will be found in the in the description below and the associated drawings. Only those pans of the fishing reel required to understand the invention are shown in the drawings.

DETAILED DESCRIPTION OF THE PREFERRED EMBODIMENTS

Figure 1:
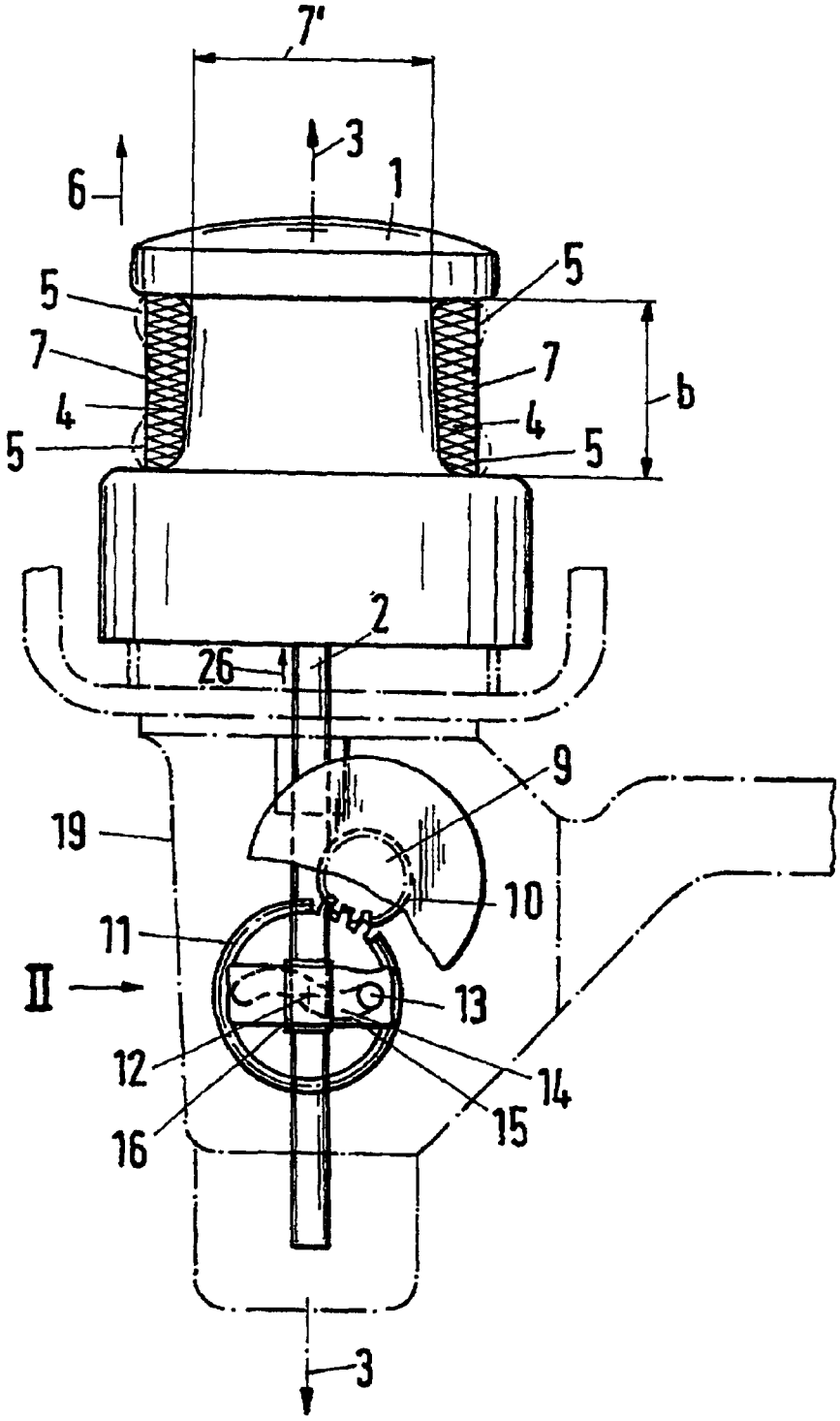
FIG. 1 is a side view of a spool with a cam drive according to a preferred embodiment of the invention.

FIG. 1 shows a fishing reel according to a preferred embodiment of the invention, with several conventional pans omitted for illustrative purposes. Spool 1 is moved by the spindle 2 in a to-and-fro direction of travel 3—3 by means of the cam drive which is described in detail below. At the same time, the fishing line or cord winding 4 is wound on the spool 1, by means of a reel winding flange. The winding flange is not shown in the drawings because it is conventional and well-known. The width of the cord winding 4 is denoted by b. If this width b exceeds a certain value, then projecting bulges 5 may be formed in the designs of the known cam drives at the sides of the cord winding 4, as discussed above. When casting the: cord in the direction of the arrow 6, the described wig formation may ensue on account of dragging along the adjacent turns of the fishing cord. The attempt therefore is made either to entirely avoid these bulges 5, that is, in the ideal case to make a cylindrical winding as shown by the surface 7 of the winding 4, or at least to so reduce the magnitude of the bulges 5 to reduce the danger of wig formation. The spool-core diameter is denoted by 7'.

Figure 2:
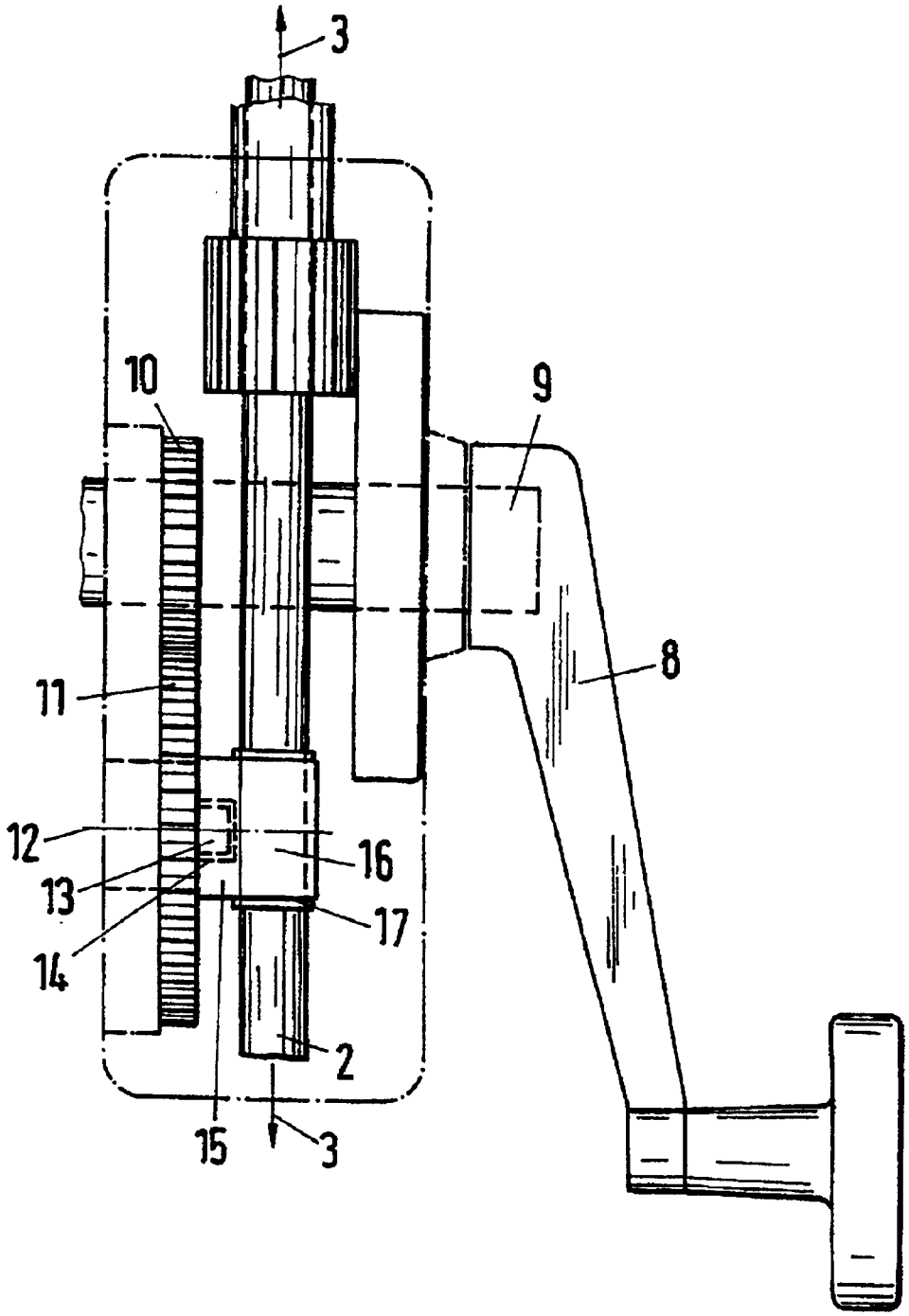
FIG. 2 is a partial side view of the cam drive in the direction of the arrow II of FIG. 1, and is shown on a scale enlarged with respect to FIG. 1.

FIGS. 1 and 2 show that when the handcrank 8 is rotated, a shaft 9 will drive a pinion 10 meshing with a larger gear 11 of the cam drive. Thereby the rotation of the handcrank 8 is reduced by the gears 10/11, i.e., the gear 11 rotates correspondingly more slowly than the handcrank 8. A cam stud 13 is affixed to gear 11 eccentrically to its axis of rotation 12, the cam stud 13 entering a guide slot 14 of a guide part 15. The guide part 15 is affixed to the spindle 2 by an attachment 16 at least to such an extent that it is able to displace this spindle in the travel direction 3—3 on account of the cam motion discussed below. For this purpose two locking rings 17 rigidly joined to the spindle 2 or the like, which rest on both sides against the attachment 16 of the guide part 15 may be used. Where called for, this design allows rotation of the spindle 2 about its own longitudinal center line. Such a design of the spindle as a rotatable shaft is required in the case a spool brake is present on the spool side away from the fishing-reel housing. Otherwise, the spindle 2 and the spool 1 can be joined not only for being driven in the travel direction 3—3, but also for being driven rotationally jointly about their longitudinal center line. This longitudinal center line coincides with the winding axis of the spool 1.

Figure 3:
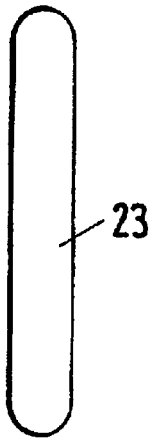
FIG. 3 is a guide slot of the type discussed in German Gebrauchsmuster 70 07 657.
Figure 4:
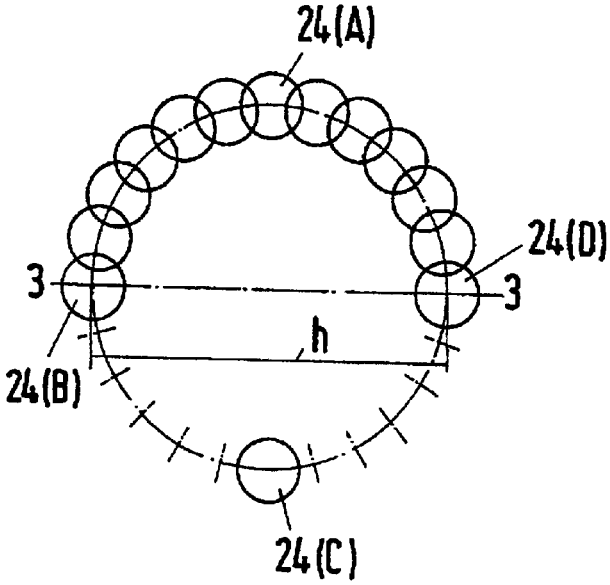
FIG. 4 shows the path of the cam stud of FIG. 3 from one reversing position to the opposite reversing position, at 15° intervals.
Figure 5:
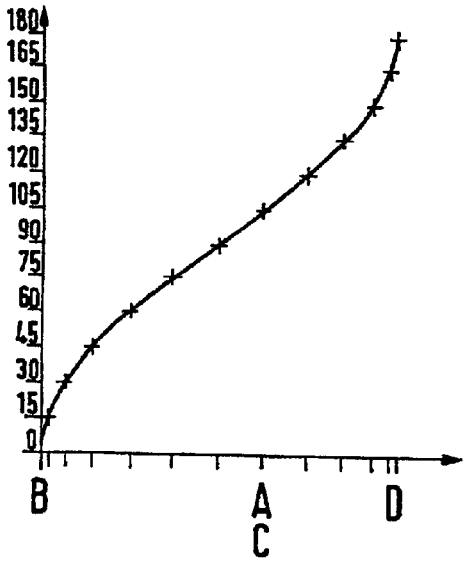
FIG. 5 is a sketch of the travel of the cam stud of FIG. 4 in one guide slot of FIG. 3.

FIGS. 3 through 5 illustrate the state of the art, in which the guide slot is a rectilinear guide slot 23 entered by a cam stud 24. The displacement of the cam stud 24 from position B, through position A, into position D and from there through position 24C again into position 24B is plotted in FIG. 5. The significance of these positions A, B, C and D is further discussed below in relation to the invention. The abscissa is the length of the travel and the ordinate shows the associated angular positions (FIG. 4) of the cam stud. It is clear that in the vicinity of positions B and D, a cam-stud displacement over an are of 30°–40° causes much less travel than at the center, that is, on both sides of positions A and C. The curve from B through A to D coincides with the curve from D through C to B.

Figure 6:
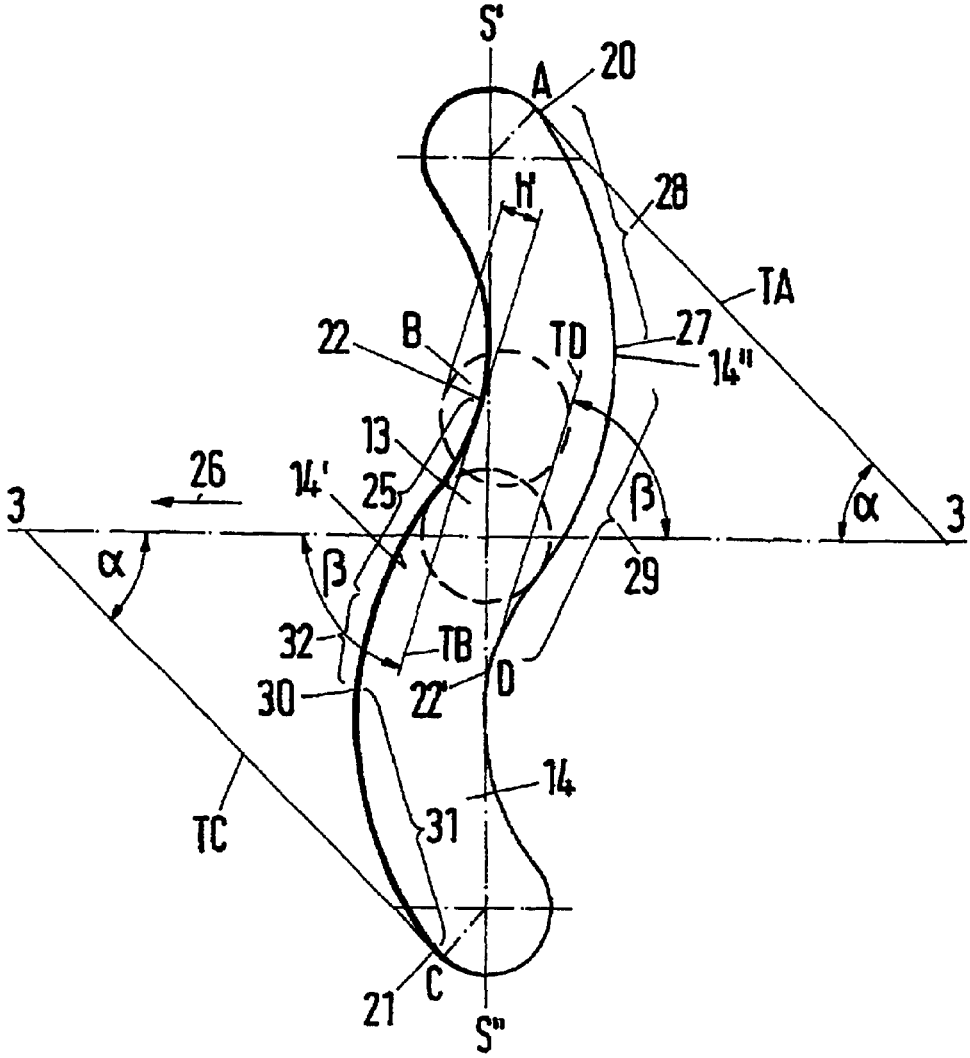
FIG. 6 shows a guide slot for the preferred spool and cam drive of FIG. 1, on an enlarged scale.
Figure 7:
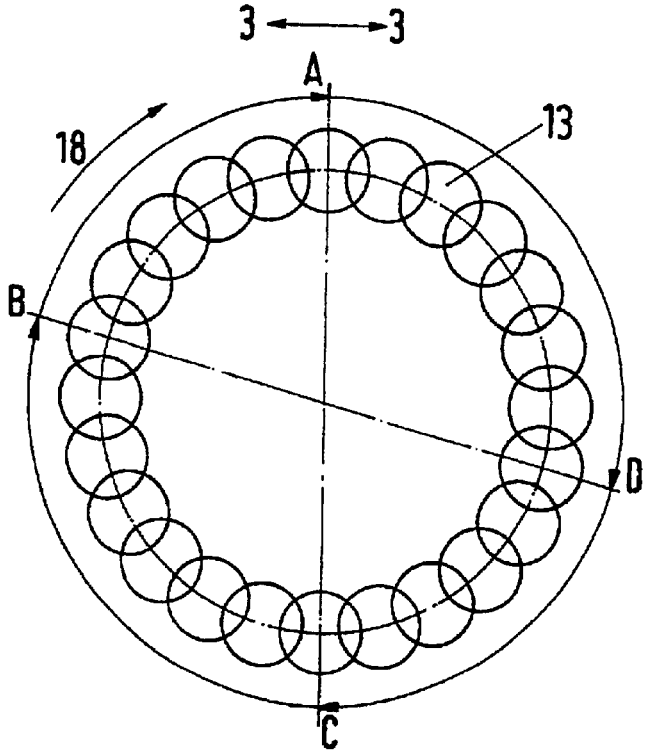
FIG. 7 is also on a somewhat larger scale and shows the revolution of a cam stud in the guide slot of FIG. 6 by a full 360° with a corresponding number of intermediate cam stud positions.
Figure 8:
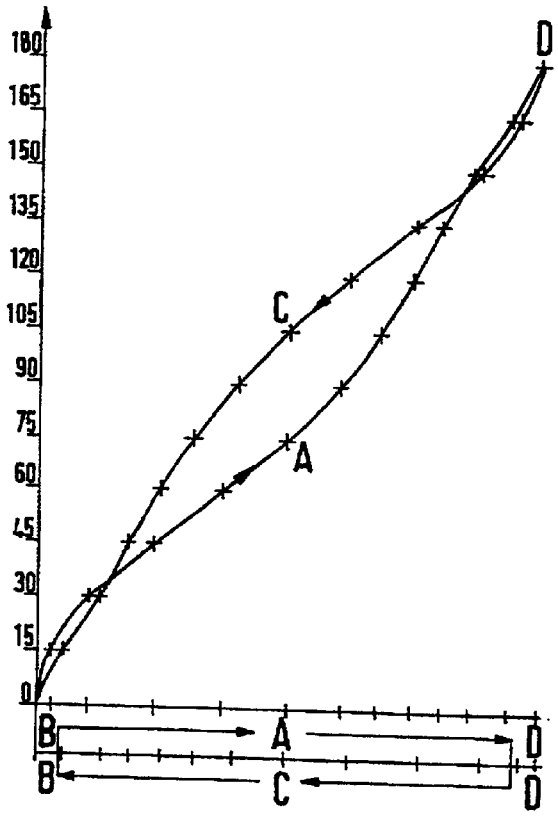
FIG. 8 is a diagram of the travel corresponding to the revolution of the cam stud of FIG. 7 in a guide slot of FIG. 6 by a full 360°.

In contrast, FIGS. 6 through 8 illustrate the preferred embodiment of the invention wherein, just as in FIGS. 3–5, the stoke direction 3—3 is shown, which, on account of the drawing, is rendered horizontally. However, for the sake of clarity, gear 11 and the guide part 15 with attachment 16 are omitted from this Figure. Cam-stud positions A, B, C, D shown in FIGS. 6–8 correspond to those shown in FIGS. 3–5, and denote the positions assumed by the cam stud 13 and the gear 11 rigidly joined to it at each 90° division of a complete revolution of gear 11. Positions B and D are the travel reversing positions and positions A and C are the two side positions. Each time the cam stud travels from one position to the next, it crosses 90°. Because the gear 11 rotates about its shaft 12, which is rigidly joined to the housing of the fishing reel (FIGS. 1,2), and therefore cannot be displaced relative to the fishing-reel housing 19, and because the cam stud 13 moves in the guide slot 14 of the guide part 15, a complete 360° revolution of the gear 11 results, by means of the shaft or spindle 2, in a complete to-and-fro motion of the spool. In position B, the spindle 2 together with the spool 1 assumes the first reversing position, wherein the spool 1 is displaced as far as possible from the fishing-reel housing (upward in FIG. 1). Following a 90°-rotation of gear 11 in the direction of the arrow 18, the first side position A is reached and the spool assumes a middle position. Following another rotation of gear 11 by about 90°, the second reversing position is reached, at which point the spool is nearest the fishing-reel housing. After another rotation of about 90°, the second side and middle position C has been reached, and after further rotation of the gear 11 by about 90°, the position B of the first reversing position is reached.

FIG. 6 shows in detail a design of the guide slot 14. The positions assumed by the cam stud 13 in the locations A, B, C and D inside the guide slot 14 are correspondingly marked. Point B is not directly located on the center line whose direction coincides with the stroke direction 3—3 and which is transverse to the longitudinal direction of the slot. Rather, point B is offset from this center line by about 20° in the direction of the arrow 18. As a result, the cam stud on segment 25 of the sidewall 14' of this guide slot imparts a corresponding speed to the guide part in the direction of the arrow 26 (also see this direction of displacement in FIG. 1), in order to increase the travel speed in this zone. The reversing position has been reached at point B. As the gear 11 rotates further, the cam stud no longer presses against the sidewall 14' but against the opposite sidewall 14" of the guide slot, starting at about the position 27, in order to then pass through the zone 28 to arrive at point: A, i.e., the first side position. As the gear keeps on rotating, the cam stud moves along the sidewall 14" and back through the zone 28 and further through the zone 29 until reaching position D, i.e., the second reversing position. It is clear that in the last segment of the zone 29, before reaching the reversing position D, the travel speed is again increased. In position D or shortly thereafter a transition takes place (just as the transition from B past the position 27), in that the cam-stud once more rests against the sidewall 14', approximately at position 30, from where the stroke proceeds through the segment 31 to C, i.e., the second side position. From there the stroke goes back through the segment 31, the further segment 32, and then the segment 25 of the sidewall 14' to position B.

The curved guidance discussed above and shown in FIG. 6 is such that when passing from position B to position A, there takes place some acceleration (also see the plot of FIG. 8), so that in the further transition from position A to position D the stroke decelerates somewhat, and again during the return from position D to position C this stroke accelerates, and lastly decelerates somewhat again from position C to position B. This is shown by the plot of FIG. 8, where the stroke as a function of the particular angular position of the gear does not result in coincident curves from B to D and back, but instead curves which are somewhat apart. To further make plain the kinematics of this design, two abscissas are shown, namely an upper abscissa with the strokes related to the particular angular positions from B through A to D and a lower abscissa for the displacement from D through C to B. By providing the desired motion, the preferred design prevents formation of bulges 5, or permits fomation of bulges which are so little that they can be neglected. Acceleration of travel near the reversing points B and D is achieved on the one hand, and on the other hand, a lesser stroke speed is achieved in the zones near A and C.

Yet another effect is achieved by the invention. Whereas the stroke path h of the state of the art is double the spacing between the cam stud 13 and the center point 12 of the gear 11, in the preferred embodiment the stroke path is increased by 2h'. This follows from the fact that when the cam stud is moved toward the point B at the sidewall 14', this sidewall is additionally displaced by h' in the direction of travel. FIG. 6 shows the associated displacement of the cam stud 13 when it is being rotated about the center of the gear 11. In the upper one of the two positions shown by dashed lines, the cam stud clearly has pressed the guide part by a distance h' in the travel direction 3—3, namely to the left. This displacement by h' will take place when the cam stud 13 is sliding, for instance, in the zone 29 along the other sidewall 14" of the guide slot 14 toward point D. In that case the guide part is displaced by h' in the travel direction 3—3 to the right. Accordingly the total travel path is h+2h+. This effect of the invention moreover can be achieved both when rotating the gear 11 in the direction of arrow 18 and in the opposite direction.

It should be borne in mind that the curved shape of the guide slot 14 must be selected in such manner that it is not always identical with the circular motion of the cam stud around the axis 12 of the gear 11, because otherwise no travel would be possible. FIG. 6 shows furthermore that the tangents TA and TC to the segments 20, 21 of the guide slot 14 receiving the cam stud 13 in the side positions A and C subtend an angle $\alpha$ with the travel direction 3—3, which is less than the angle $\beta$ subtended by the tangents TB and TD of the sidewalls 14', 14" in their segments 22, 22', wherein the cam stud 13 is in the reversing positions B and D respectively. The above angles preferably are $\alpha$=40°–50° (45° in the embodiment shown) and $\beta$=70°–75° (72.5° in the illustrated embodiment). An angle which is always smaller than 90° is thereby provided between the particular tangents TB, TA, TD and TC extending in the stroke direction, and the stroke direction 3—3. As a result, the stroke caused upon rotating the gear 11 by the cam stud 13 over the particular sidewall 14' or 14", and by the guide part 15 on the spindle 2, is less per unit time in the segments 20, 21 than in the segments 22, 22'.

Preferably, the guide slot 14 is formed in the shape of an elongated letter S (FIGS. 1, 6), with a lack of geometric congruence, for reasons apparent from the above discussion, between arcuate zones of the guide slot and the path of the cam stud about the origin of the circle described by the gear. The sidewalls 14', 14" may be either rectilinear or, as in this preferred embodiment, arcuate along this S, averting abrupt transitions such as edges or corners. The positions B and D of the cam stud are located approximately at the center of the S, whereas the positions A and C of the cam stud are located in the end zones of the S. The longitudinal direction of the S is at an angle, preferably a right angle to the stroke direction 3—3. This angular position of the longitudinal direction of the S to the stroke direction 3—3 and the curved shape of the side walls 14', 14" are so dimensioned that the sidewall 14' facing the spool moves away from the spool 3 as it approaches this point B, and furthermore the sidewall 14" nears the spool 3 as it moves toward point D when it is in its zone 29 in front of point D, resulting in an additional travel h' as described above. Finally, in order to achieve maximum compactness, the S is preferably arranged in mirror-inverted form, as shown in FIGS. 1 and 6.

It will of course be appreciated by those skilled in the art that a variety of modifications of the preferred embodiment as described in detail herein are possible. It is intended, therefore, that the invention not be limited by the above description, but rather that it be limited solely by the appended claims.

We claim:

1. In a fishing reel which includes a spool for receiving a fishing line, means for winding the fishing line on the spool, a crank drive, a cam drive, and a spindle member connected to the spool, the spool having a longitudinal axis and being displaced to and fro parallely to the longitudinal axis between reversing positions of the spool at which a direction of displacement of the spool reverses by means of the cam drive which causes the spindle member to also move to and fro parallely to the longitudinal axis, the cam drive including a guide part having a guide slot which includes sidewalls, said guide part being connected to the spindle member, a gear rotated by said crank drive, a cam stud, and means for eccentrically mounting the cam stud on the gear to rotate in a circular path about an axis of rotation, said stud entering the guide slot and sliding along said sidewalls of the slot to displace said guide part and therefore the spool in the direction parallel to the longitudinal axis, the improvement wherein the guide slot has an elongated S shape, said cam drive forming drive means for causing the cam stud to be approximately [midway] *in a mid-section* between end zones of the S when the spool is at said reversing positions of the spool and in one of the end zones of the S when the spool is at [a position] *positions* approximately midway between said reversing positions, wherein a line connecting said end zones of the S subtends a nonzero angle with respect to the direction of displacement of the guide part, and wherein as the spool is moved from one reversing position to [a position] *one of said positions* approximately midway between said reversing positions, and from said [position] *one of said positions* approximately midway between said reversing positions to a next reversing position, said drive means causes said cam stud to impart to the guide part continuously changing stroke speeds as a result of the shape of the guide slot and displacement of the cam stud, said sidewalls also forming means for causing the stroke speed to increase as the spool approaches one of the reversing positions, and for causing the stroke speed to decrease as the spool approaches the position approximately midway between the reversing positions, wherein segments of the sidewalls in which the cam stud is located before reversal of the spool displacement direction are spaced [farther from] *closer to* a line through the slot whose direction coincides with the direction of displacement of the guide part and which is [transverse] *parallel* to said longitudinal [direction] *axis* than are segments of the sidewalls in which the cam stud is located substantially [at the side positions] *in said end zones of the S*.

2. An improvement as claimed in claim 1, wherein the elongated S is in the form of a mirror-inverted letter S.

3. An improvement as claimed in claim 1, wherein the guide slot has arcuate zones and said arcuate zones of the guide slot and the circular path of the cam stud are incongruent.

4. An improvement as claimed in claim 1, wherein near the two side positions, an angle of the sidewalls relative to the direction of displacement of the guide part is approximately 40°–45°, and an angle of the sidewalls near the reversing positions in the direction of displacement of the guide part is approximately 70°–75°, slopes of the sidewalls relative to the travel direction changing continuously, without abrupt transitions from one position to the next.

5. An improvement as claimed in claim 1, wherein said nonzero angle is an approximately 90° angle.

6. An improvement as claimed in claim 1, wherein a curvature of the sidewall of the guide slot is such that stroke distance of the spool is larger than a stroke distance moved by the cam stud in the direction of spool movement.

* * * * *